June 5, 1945. T. O. STRAUSS 2,377,459
INTERNAL-COMBUSTION ENGINE
Filed March 22, 1940 4 Sheets-Sheet 1
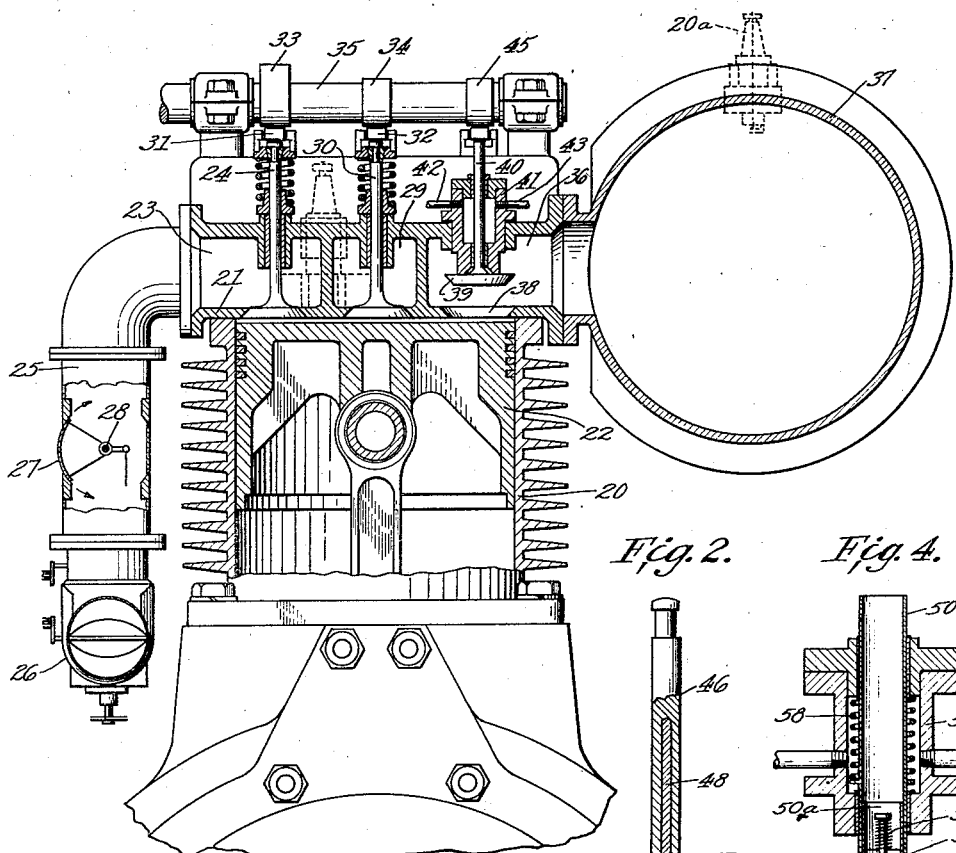
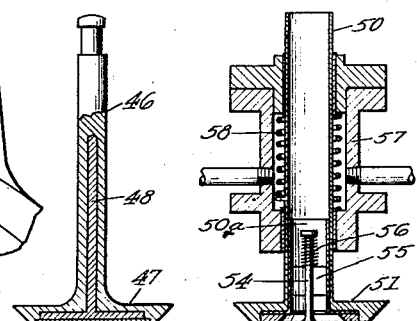
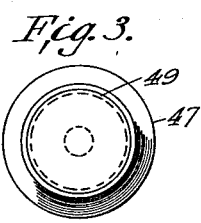
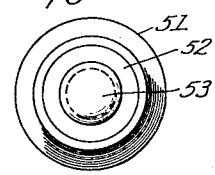
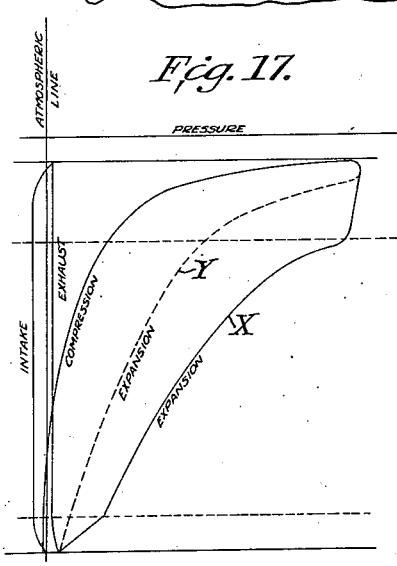
Inventor
Theodore O. Strauss.
Attorneys

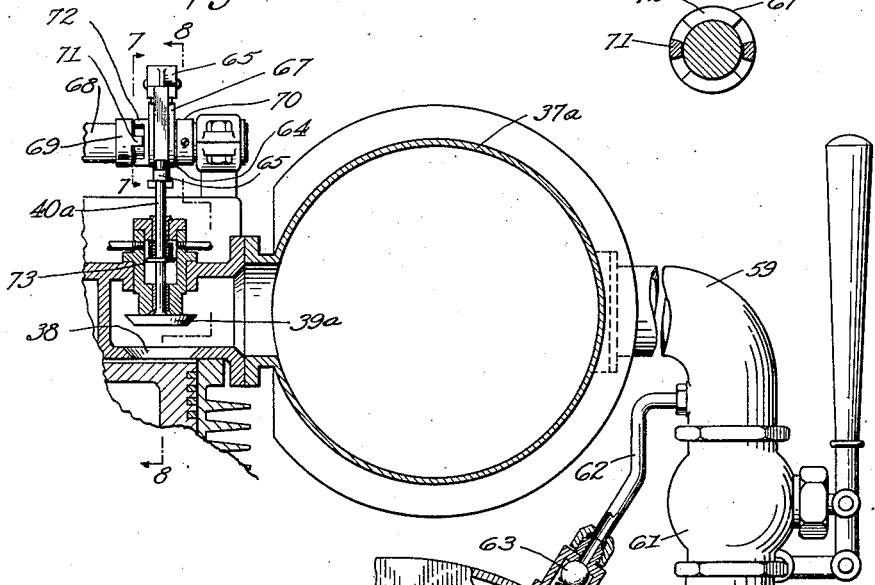

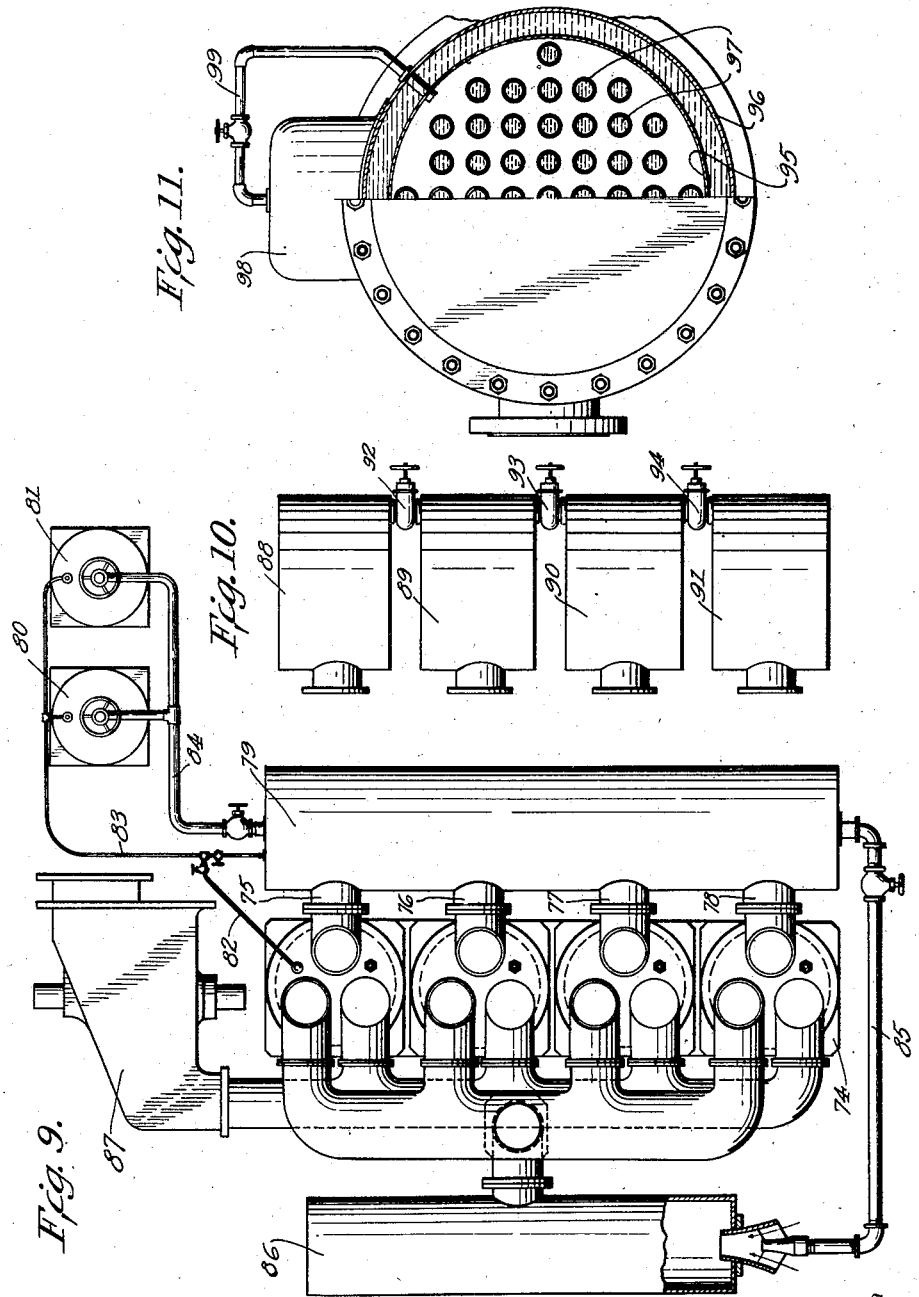

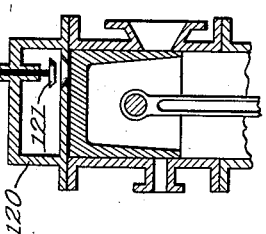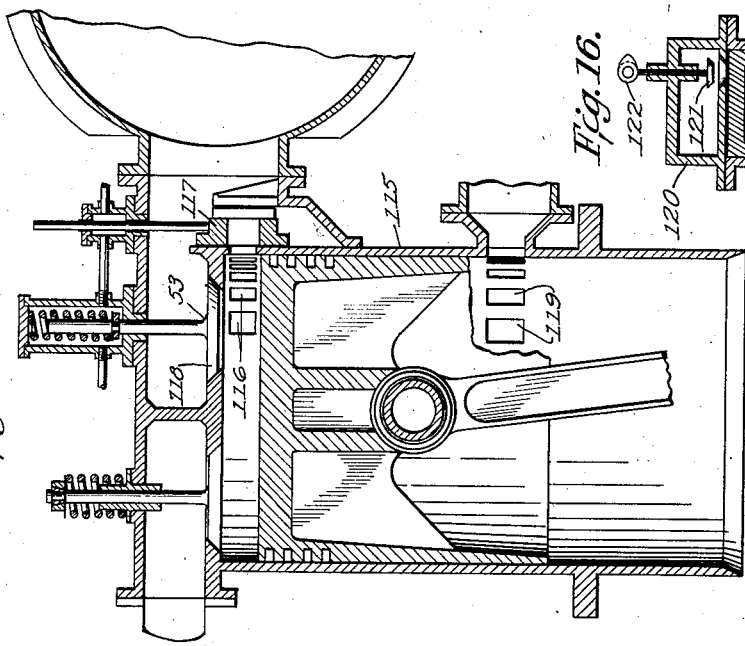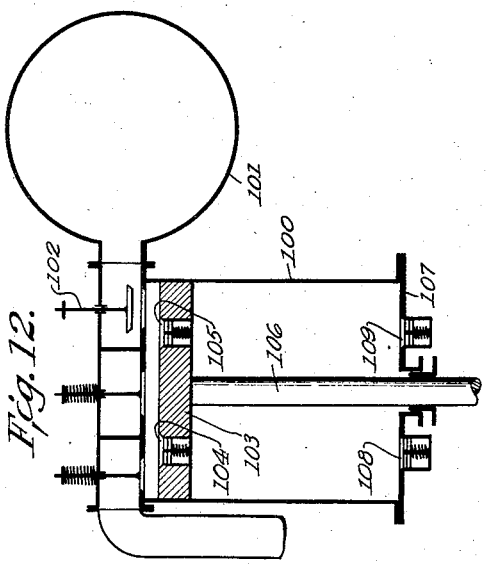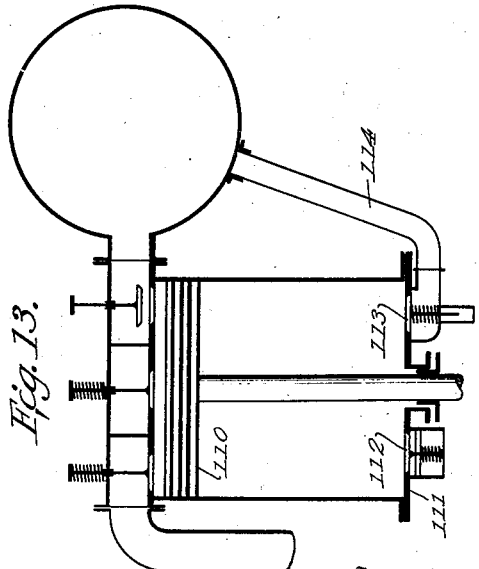

Patented June 5, 1945

2,377,459

UNITED STATES PATENT OFFICE 2,377,459

INTERNAL-COMBUSTION ENGINE

Theodore O. Strauss, New York, N. Y.

Application March 22, 1940, Serial No. 325,461

7 Claims. (Cl. 123—1)

The present invention relates to internal combustion engines, and has as its purpose to increase materially the operating efficiency of such engines. To this end a main feature of the invention is the provision of what I shall term a compensator receiver in connection with the combustion chamber of the engine, this receiver being charged at explosion or peak pressure and returning pressure to the said chamber during the power stroke so that a substantially constant high pressure is caused to exist in the chamber for a certain prolonged period. I thus increase the power of the engine and reduce the engine temperature, vibration and noise. As a result of the temperature reduction, the exhaust is relatively cool, and hence may be favorably utilized to drive an exhaust turbine. The invention is applicable to any engine of the type having a combustion chamber defined by a fixed member and a movable power transmitting member, the ordinary example being the cylinder and the piston.

In order that the invention may be clearly understood, I shall describe it in detail with reference to the accompanying drawings, which show the invention in illustrative and practical embodiment.

In the drawings:

Figure 1 is an end elevation of an internal combustion engine equipped with a compensator receiver according to the present invention, the receiver and cylinder and piston of the engine being shown in section, and the intake conduit being broken away to show a certain intake control feature.

Figure 2 is an axial section of a form of valve which may be utilized for the control of the connection between the combustion chamber and the receiver in Figure 1.

Figure 3 is a face view of the valve of Figure 2.

Figure 4 is an axial section of another form of valve and mounting means therefor.

Figure 5 is a face view of the valve of Figure 4.

Figure 6 is a sectional view of a portion of an engine equipped with the receiver of the present invention and also with a starting accumulator.

Figure 7 is a section on line 7—7 of Figure 6.

Figure 8 is a section on line 8—8 of Figure 6.

Figure 9 is a plan view of a multiple-cylinder engine equipped with the receiver of the present invention, with starting bottles, with a kinetic super-charger, and with an exhaust turbine.

Figure 10 is a plan view of a modified form of receiver which may be applied to a multiple-cylinder engine.

Figure 11 is an elevation and section of a receiver equipped with steam generating means.

Figure 12 is a section of an engine cylinder and receiver equipped for the supply of air under pressure to the combustion chamber.

Figure 13 is a section of an engine cylinder and receiver showing auxiliary means for supplying pressure to the receiver.

Figure 14 is a section of an engine cylinder and receiver, with modified valve control means.

Figure 15 illustrates means for varying the capacity of a receiver.

Figure 16 is a section of an engine cylinder and receiver, the latter being located in the cylinder head, and Figure 17 is a diagram.

Referring to the drawings, and first to Figure 1, reference numeral 20 designates the cylinder of an internal combustion engine and reference numeral 21 the cylinder head, which, as shown, has a flat lower face normal to the cylinder axis. Reference numeral 22 designates a piston which, as shown, has a flat top face normal to the cylinder axis, and its travel is such that at the top of its stroke there is only a minute clearance between it and the cylinder head. Consequently, at the top of the piston stroke the combustion chamber has, for all intents and purposes, disappeared.

The cylinder head has a passage 23 provided with an inlet opening controlled by an inlet valve 24, the passage being in connection with a conduit 25 leading from a carburetor 26. The conduit 25 has a portion of square section provided with an opening controlled by an arcuate closure member 27 mounted on a rock shaft 28. In the position shown the opening is closed so that fuel can flow through the conduit for normal operation. If closuure 27 is swung ninety degrees in a counterclockwise direction, the carburetor will be shut off, and air only will be drawn in through the opening in the conduit sidewall. If the closure is swung ninety degrees in a clockwise direction, the intake conduit will be closed. The latter dispositions are utilizable when it is desired to secure a braking action.

The cylinder head is provided also with an exhaust passage 29 and with an exhaust opening controlled by an exhaust valve 30. The intake and exhaust valves are respectively operated through rocker arms 31 and 32 from cams 33 and 34 on the usual cam shaft 35 driven at half the speed of the crank shaft.

The cylinder head is provided with a further passage 36 in connection with the compensator receiver 37 which is otherwise closed and constructed so as to withstand high internal pressure. Passage 36 is in connection with the combustion chamber of the engine through an opening 38, which is adapted to be closed by a valve 39. The latter has a stem 40 slidably guided in bushings at the ends of a hollow box 41 secured in the top wall of the cylinder head and provided with inlet and outlet connections 42 and 43 for a cooling fluid. Valve 39 is adapted to be closed by means of a rocker arm 44 actuated by a cam 45 on cam shaft 35.

Assuming that the piston 22 is at the beginning of the intake stroke of its four-stroke cycle, it will descend, and valve 24 being open and the closure 27 being in the position illustrated, fuel will be drawn into the cylinder. At the top of the succeeding compression stroke, the pressure will cause valve 39 to lift and this lift will be completed as the explosion occurs at or near the top limit of the piston travel. Combustion occurs in the very small combustion space, but for the most part in the receiver 37. During this period a low part of cam 45 has been over rocker arm 44, so that free upward movement of valve 39 has been permitted, and after the explosion has occurred, gases will flow back through the opening 38 to drive the piston on its power stroke. After a piston travel corresponding to the first forty-five degrees of the power stroke, as here contemplated, cam 45 closes valve 39. After a few repetitions of the cycle, peak pressure exists in the receiver and will remain substantially constant as long as the engine is running.

I have found that this substantially constant pressure can be maintained only if the volume of the receiver is considerably larger than the cylinder volume, and by cylinder volume I mean the maximum volume when the piston is at the bottom of its stroke. I have stated above that the valve 39, which I shall call the receiver valve, remains open during the first forty-five degrees of the power stroke. With this opening period I am able to secure the benefits of the invention when the receiver volume is eight times that of the maximum cylinder volume, although I have not found that this volumetric relation is necessarily critical. I give it merely by way of example. Since a substantially constant pressure is maintained in the receiver, it follows that the piston is being affected by a substantially constant pressure during the first forty-five degrees of the power stroke. In other words, instead of a momentary peak, there is prolonged peak, with consequent greater power.

The forty-five degrees stroke at constant pressure is also not critical and may be greater or less. If greater, the receiver volume will be made larger, and if smaller, the receiver volume can be made smaller. Generally speaking, the volumetric relation is such that substantially constant pressure will be maintained in the combustion chamber during the period the receiver valve is open.

Minimum piston clearance is an important factor in securing maximum efficiency. Applying the receiver of the present invention to an engine with ordinary piston clearance, I have found that there is a considerable drop in peak pressure and a consequent drop in mean effective pressure. By reducing the clearance to a minimum, normal peak pressure is obtained. In Figure 17, X represents the expansion curve of an engine, having minimum clearance, equipped with a receiver having the volumetric relation, above discussed, to the compression chamber. The line Y represents the expansion curve of the conventional engine. This graphically shows the considerable prolongation of substantially peak pressure obtained by the present invention.

The receiver 37 may be equipped with a spark plug 20a which operates constantly or intermittently to cause the combustion of any live fuel in the receiver.

The receiver valve is, of course, subjected to very high temperature and may be cooled in the manner shown in Figure 1. In Figures 2 and 3 I have shown a valve particularly designed for efficient heat conduction to the cooling chamber. In these figures the valve comprises an integral stem portion 46 and head portion 47. The lower part of the head portion is recessed and the stem portion is provided with an axial bore, the recess and bore having a filling 48 of any suitable highly heat conductive material, such as copper or silver, the recess being closed by a welded steel disk 49.

Superior results as to cooling can be secured by the use of a valve such as is shown in Figures 4 and 5. Here the valve has a stem portion 50 and head portion 51 provided with a through longitudinal passage. The free face of the head portion is recessed and a flanged sleeve or liner 50a is pushed into the passage, the flange being engaged by a welded ring 52 to hold the liner in place, the ring providing a conical valve seat. A valve disk 53 is cooperable with the seat and has a stem 54 guided in a spider 55 secured within the liner 50a, the disk being normally seated by a compression spring 56. The stem 50 is slidably guided in a hollow cooling box 57 and is pressed downwardly by means of a spring 58, so that the head portion 51 is normally seated. In use the copper liner conducts heat to the cooling space when the valve is lifted, and on the intake stroke air is drawn through the hollow stem and head, opening valve disk 53 against the action of spring 56 so that an air cooling action is additionally secured. Being spring pressed to closed position, it will, of course, be necessary to provide means for moving the receiver valve to and holding it in open position, and suitable means for accomplishing this will be described hereinafter in connection with the embodiment shown in Figures 6 to 8.

Referring to Figure 6, the combustion chamber is shown as being in connection through the opening 38 with a compensator receiver 37a, and a conduit 59 leads from the latter to a starting accumulator 60 of considerably larger capacity, as here shown, than the receiver. Flow through conduit 59 is controlled by a valve 61 which is shown in closed position. Between the receiver 37a and valve 61, a small tube 62 is connected into the conduit 59 and leads through a check valve 63 to the interior of the accumulator 60. Valve 61 being closed, pressure will seep into the accumulator from the receiver past check valve 63 when the motor is running and starting pressure will be built up in the accumulator, and this pressure will approach the peak pressure even when the gases have cooled. In order to start the motor, valve 61 is opened and pressure flows through conduit 59 and the receiver to the engine. In order to utilize this starting pressure, valve 39a must be mechanically opened.

On the stem 40a of the receiver valve is an abutment 64, under which is engaged one end of a rocker arm 65 which carries a roller 66 for cooperation with a cam 67. The cam 67 is free on cam shaft 68 between two fixed collars 69 and 70, and a lost motion clutch is provided between the cam and the collar 69 by lugs 71 on the latter engaged in recesses between lugs 72 on the former. As shaft 68 rotates the clutch members come into engagement and the cam rise swings the rocker arm 65 upwardly, thus lifting the receiver valve to the position shown in Figures 6 and 8. As soon as the point of the cam passes the lowermost point of the roller 66, a valve spring 73 forces the receiver valve to closed position, and its action causes cam 67 to be snapped in clockwise direction, Figure 8, thus immediately freeing the roller 66 so that the valve immediately closes. The cam opens the receiver valve at the beginning of the stroke, and the spring snaps the valve to closed position after a forty-five degree rotation of the crank shaft, or at any other point which may be chosen. In order to utilize the starting pressure, it will be understood that in a single cylinder engine, it may be necessary to turn the crank shaft so as to open the receiver valve.

In Figure 9, I have shown a four cylinder internal combustion engine 74 with its combustion spaces connected by individual conduits 75, 76, 77 and 78 into a common receiver 79. Here, as before, each cylinder is equipped with a receiver valve so that the receiver is placed in connection with the combustion chamber during a predetermined period. In a four cylinder engine, there will be no overlapping of these open periods, if they are sufficiently small, and the receiver need have no greater volume than as though it were associated with a single cylinder. Even with an eight cylinder in line engine, there will be no overlapping when the receiver valves are each opened only during a forty-five degree turn of the crank shaft. If the opening period or the number of cylinders is such that there is an overlapping of open periods, this will not affect the necessary size of the receiver, for the reason that if a plurality of receiver valves are about to close, thus still drawing from the receivers, an equal number will be opening at the explosion point. Consequently, if the volumetric ratio of eight to one between the receiver and the cylinder of a single cylinder engine has been chosen, the same receiver is equally well utilizable in connection with any number of cylinders having the same size as that of the single cylinder. On the other hand, with a multi-cylinder engine, and especially one which is run at constant speed over long periods, it may be desirable to increase the volumetric ratio substantially beyond eight to one.

In Figure 9 reference numerals 80 and 81 designate starting bottles or accumulators which may be charged either from a cylinder or cylinders, or from the compensator receiver through valve controlled conduits as at 82 and 83. Starting pressure is admitted from the starting bottles through a valve controlled conduit 84 to the receiver 79 and thence to the several cylinders.

In Figure 9, I have also shown a valved conduit 85 leading from the receiver to a kinetic super-charger 86 and I have also shown an exhaust turbine 87 in connection with the exhaust manifold.

In Figure 10, I have shown a receiver applicable to the engine of Figure 9 and comprising four units 88, 89, 90 and 91 intercommunicating through valved connections 92, 93 and 94. In the case of a dead cylinder, its receiver can be cut off from the others.

Figure 11 shows a compensator receiver 95 provided with a water jacket 96 and with water tubes 97 for the purpose of generating steam for injection into the receiver to cool the same. The generated steam is conducted to a dome 98 and thence to the interior of the receiver through a valved injection conduit 99. Or, water may be injected directly into the receiver. Cooling of the receiver is ordinarily not necessary unless it is of a minimum capacity as compared to the cylinder volume. When the receiver is over-size, it may be necessary to insulate it to prevent over-cooling of the gases.

In Figure 12 reference numeral 100 designates a cylinder having its combustion chamber in connection with a compensator receiver 101 through a receiver valve 102. The piston 103 is provided with upwardly opening spring-seated check valves 104 and 105 and the rectilinearly reciprocating piston rod 106 is passed through a bottom closure plate 107 which is provided with upwardly opening spring seated check valves 108 and 109. When the piston moves upwardly, it draws air through the valves 108 and 109, and when the piston moves down again the air is compressed until valves 104 and 105 open, the compressed air then passing to the combustion chamber to raise the pressure in the latter.

In Figure 13 the arrangement is the same, except that the piston 110 is solid and the bottom closure plate 111 is provided with one upwardly opening check valve 112 and one downwardly opening check valve 113. The latter controls a connection 114 to the receiver. In this case, as the piston moves upwardly, air is drawn into the cylinder past valve 112 and on the descent of the piston, is forced past valve 113 through conduit 114 to the receiver so as to add to the pressure in the latter.

In Figure 14 the cylinder 115 has a number of ports 116 adjacent the upper extremity of one of its side walls, these ports being controlled by a slide valve 117 which may be operated in the same manner as the receiver valve of Figures 6 and 8. The receiver is also adapted to be placed in connection with the combustion chamber through an opening in the cylinder head normally closed by a spring-pressed valve 118. Exhaust ports are shown at 119. In this case the valve 118 is opened by pressure at the top of the power stroke and immediately afterward valve 117 is moved up to the open position shown, closing again after the predetermined travel of the piston on its power stroke. As the piston approaches the bottom of its travel it uncovers exhaust ports 119 and the gases are largely exhausted. The residue is recompressed past valve 118 into the receiver.

The receiver volume may be varied by providing different end caps, as indicated in Figure 15. In this figure, reference numeral 37b designates a flat cap, 37c an outwardly dished cap, and 37d a cap which is still more outwardly dished.

In Figure 16 I have shown a two-cycle engine provided with a receiver 120 constituting the cylinder head. The receiver valve 121 is indicated as operating in the same manner as in Figure 1, but in this case the closing cam 122 will, of course, be rotated at the speed of the crank shaft.

It may be mentioned that in order to reduce resistance to the flow of gases through the receiver valve, a relatively large valve should be used, or a plurality of valves may be provided. Any kind of supercharging known to the art may be adopted. The exhaust turbine may be utilized to drive the super-charger or for other purposes, for example, to drive a compressor to boost the pressure in the receiver, or to supply air to the starting accumulator.

The invention is applicable to internal combustion engines of the two or four cycle type, single or double acting, cooled by air or water or otherwise. Tappet, piston, sleeve, rotary or plain slide valves may be utilized according to preference. Fuel supply may be by carburation or injection, and ignition may be accomplished by electric spark or by compression, or both combined. While in some of the embodiments, I have shown starting accumulators, the engine may, of course, be started by an electric starter or in any other manner. In the use of an electric starter, the compensator valve mechanism can have the simplified form shown, for example, in Figure 1, wherein the combustion pressure is utilized as the means for opening the valve and the valve is closed at the proper point by a cam. It will be understood that the intake and exhaust provisions may be entirely conventional, the intake and exhaust valves being operated and timed in the usual manner.

From the above it will be seen that many variations are possible in the application of the invention, and, accordingly, I do not limit myself to details of construction or arrangement, except as in the following claims.

This application is a continuation-in-part of my application Serial No. 136,182, filed April 10, 1937.

I claim:

1. The combination with an internal combustion engine including a cylinder, a reciprocating piston in said cylinder, said piston and cylinder defining a combustion chamber and the piston travel being such that at the top of its stroke, substantially no combustion space exists between the piston and the cylinder, and charging and exhaust provisions, of a compensator receiver in connection with said combustion chamber and in which pressure is built up as the result of the combustion of fuel introduced into said chamber, a valve for controlling flow from said receiver to said chamber, means for opening said valve at the start of the power stroke, and means for closing said valve after a predetermined extent of travel of said piston during the power stroke, said receiver having a volume sufficiently greater than the volume of said combustion chamber at the end of said predetermined travel of said piston so that substantially constant pressure is maintained in the chamber during the period said valve is open.

2. The combination with an internal combustion engine including a cylinder, a reciprocating piston in said cylinder, said cylinder and piston defining a combustion chamber, and charging and exhaust provisions, of a compensator receiver in connection with said combustion chamber, a valve controlling said connection and adapted to automatically open the same as the result of combustion in said chamber so that pressure is built up in said compensator receiver, and means for closing said valve after a predetermined travel of said piston during the power stroke, said compensator receiver having a volume sufficiently greater than the volume of said combustion chamber at the end of said predetermined travel of said piston so that substantially constant pressure is maintained in the chamber during the period said valve is open.

3. The combination with an internal combustion engine including a cylinder, a reciprocating piston in said cylinder, said cylinder and piston defining a combustion chamber, and charging and exhaust provisions, of a compensator receiver in connection with the combustion chamber, a valve controlling the connection and opening to admit pressure to said compensator receiver as a result of combustion in said chamber, a second valve independent of the first for controlling flow from said receiver to said chamber, and means for controlling said second valve so that it is open only during a predetermined travel of said piston during the power stroke, said receiver having a volume sufficiently greater than that of said combustion chamber when the piston is at the end of its predetermined travel so that substantially constant pressure is maintained in the chamber during the period said second valve is open.

4. The combination with a multiple cylinder internal combustion engine including reciprocating pistons in the cylinders and defining combustion chambers therewith and the travel of the pistons in their associated cylinders being such that at the top of their stroke, substantially no combustion space exists between the respective pistons and cylinders, and charging and exhaust provisions, of a compensator receiver in connection with all of the combustion chambers and in which pressure is built up as the result of the combustion of fuel introduced into said chambers, valves for controlling flow from said receiver to said chambers respectively, said valves being adapted to be opened at the start of the power stroke of their associated pistons, and means for closing said valves after a predetermined travel of the associated pistons during their power stroke, said receiver having a volume sufficiently greater than the volume of each one of the combustion chambers at the end of the predetermined piston travel so that substantially constant pressure is maintained in the chambers during the period the valves are open.

5. The combination with a multiple-cylinder internal combustion engine including reciprocating pistons in said cylinders and defining combustion chambers with the latter, and charging and exhaust provisions, of a compensator receiver in connection with the combustion chambers, valves controlling the connection between the receiver and the respective chambers, means for controlling said valves so that each is opened at the start of the power stroke of its associated piston and then closed after the piston has traveled a predetermined distance on its power stroke, said receiver having a volume sufficiently larger than that of each combustion chamber at the end of said predetermined travel so that substantially constant pressure is maintained in the chambers during the period the valves are open, an accumulator charged from the combustion chambers, and a valved connection between the accumulator and the compensator receiver so that starting pressure can be admitted through the latter to the combustion chambers.

6. The combination with an internal combustion engine, including a cylinder, a reciprocating piston in said cylinder, said cylinder and piston defining a combustion chamber at the top of the piston and a compression chamber below the piston, and charging and exhaust provisions, of a compensator receiver in connection with the combustion chamber and in which pressure is built up as the result of the combustion of fuel introduced into said combustion chamber, a valve for controlling flow from said receiver to said combustion chamber, said valve being adapted to be opened at the start of the power stroke, means for closing said valve after a predetermined travel of said piston during the power stroke, a connection between said compression chamber and said receiver, and a check valve in the last mentioned connection permitting flow from the compression chamber to the receiver, said receiver having a volume sufficiently greater than the volume of the combustion chamber at the end of said predetermined piston travel so that substantially constant pressure is maintained in the combustion chamber during the period said valve is open.

7. The combination with an internal combustion engine including a cylinder, a reciprocating piston in said cylinder, said cylinder and piston defining a combustion chamber at the top of the piston and a compression chamber below the piston, and charging and exhaust provisions, of a compensator receiver in connection with the combustion chamber and in which pressure is built up as the result of the combustion of fuel introduced into said combustion chamber, a valve for controlling flow from said receiver to said combustion chamber, said valve being adapted to be opened at the start of the power stroke, means for closing said valve after a predetermined travel of said piston during the power stroke, a connection between said compression chamber and said combustion chamber, and a check valve in the last named connection permitting flow from the compression chamber to the combustion chamber, said receiver having a volume sufficiently greater than the volume of said combustion chamber at the end of said predetermined piston travel so that substantially constant pressure is maintained in the combustion chamber during the period said valve is open.

THEODORE O. STRAUSS.